US012620271B2

(12) United States Patent
Tapia

(10) Patent No.: US 12,620,271 B2
(45) Date of Patent: May 5, 2026

(54) SYSTEM FOR DETERMINING POWER SOURCE LOCATION AND AVAILABILITY

(71) Applicant: T-Mobile USA, Inc., Bellevue, WA (US)

(72) Inventor: Jose Tapia, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 314 days.

(21) Appl. No.: 18/323,165

(22) Filed: May 24, 2023

(65) Prior Publication Data

US 2024/0395077 A1 Nov. 28, 2024

(51) Int. Cl.
| | |
|---|---|
| *G07C 5/00* | (2006.01) |
| *B60L 53/63* | (2019.01) |
| *B60L 58/12* | (2019.01) |
| *G07C 5/02* | (2006.01) |
| *H04L 67/12* | (2022.01) |
| *H04L 67/53* | (2022.01) |

(52) U.S. Cl.
CPC .............. *G07C 5/008* (2013.01); *B60L 58/12* (2019.02); *G07C 5/02* (2013.01); *H04L 67/12* (2013.01); *H04L 67/53* (2022.05); *B60L 53/63* (2019.02); *B60L 2240/62* (2013.01); *B60L 2250/00* (2013.01)

(58) Field of Classification Search
CPC .......... G07C 5/008; G07C 5/02; B60L 58/12; B60L 53/63; B60L 2240/62; B60L 2250/00; H04L 67/53; H04L 67/12
USPC ....................................................... 701/31.4
See application file for complete search history.

(56) References Cited

U.S. PATENT DOCUMENTS

| | | | | |
|---|---|---|---|---|
| 5,784,597 | A * | 7/1998 | Chiu ....................... | H04L 5/143 |
| | | | | 713/502 |
| 5,787,483 | A * | 7/1998 | Jam ..................... | H04L 63/0435 |
| | | | | 711/158 |
| 6,487,477 | B1 * | 11/2002 | Woestman ............ | B60W 10/08 |
| | | | | 340/439 |
| 8,103,386 | B2 * | 1/2012 | Ichikawa ................ | H02J 3/003 |
| | | | | 700/297 |
| 8,330,415 | B2 * | 12/2012 | Sato ........................ | B60L 53/65 |
| | | | | 320/109 |
| 9,020,634 | B2 * | 4/2015 | Bailey ....................... | B07C 5/00 |
| | | | | 209/584 |
| 9,739,624 | B2 * | 8/2017 | Rajagopalan ...... | G01C 21/3415 |
| 10,395,444 | B1 * | 8/2019 | Edren .................. | G07C 5/0808 |
| 11,393,335 | B2 * | 7/2022 | Hishida ................ | G08G 1/0112 |
| 12,191,699 | B2 * | 1/2025 | Salter ...................... | B60L 53/68 |
| 2004/0148083 | A1 * | 7/2004 | Arakawa ................ | G07C 5/085 |
| | | | | 701/50 |
| 2010/0094496 | A1 * | 4/2010 | Hershkovitz ........... | B60L 50/66 |
| | | | | 701/22 |
| 2011/0046775 | A1 * | 2/2011 | Bailey ....................... | B07C 3/02 |
| | | | | 700/224 |

(Continued)

*Primary Examiner* — Luis A Martinez Borrero
(74) *Attorney, Agent, or Firm* — Lee & Hayes, P.C.

(57) ABSTRACT

A network may be configured to monitor the usage and location of mobile devices, such as electric vehicles, and to report the usage and location data to a third-party utility system. The network may also allow owners of the mobile devices to register their devices such that proximate third-party utility systems may utilize the storage capacity of their mobile devices, the electric vehicles, during peak production and to access stored charge during periods of excess consumption.

20 Claims, 5 Drawing Sheets

(56) References Cited

U.S. PATENT DOCUMENTS

| | | | | |
|---|---|---|---|---|
| 2012/0083932 A1* | 4/2012 | Ramaswamy | B60L 53/63 | 700/291 |
| 2012/0143413 A1* | 6/2012 | Cho | B60L 15/2045 | 701/22 |
| 2012/0249068 A1* | 10/2012 | Ishida | B60L 55/00 | 320/109 |
| 2013/0073113 A1* | 3/2013 | Wang | B60W 20/11 | 701/1 |
| 2013/0158758 A1* | 6/2013 | Kim | G07C 5/004 | 701/123 |
| 2013/0162025 A1* | 6/2013 | Momose | B60L 53/51 | 307/9.1 |
| 2013/0184882 A1* | 7/2013 | Momose | B60L 53/68 | 700/286 |
| 2014/0077766 A1* | 3/2014 | Takeuchi | G06Q 30/06 | 320/128 |
| 2014/0336965 A1* | 11/2014 | Mori | H02J 7/0013 | 702/63 |
| 2015/0228129 A1* | 8/2015 | Cox | G06Q 10/08 | 701/1 |
| 2017/0232300 A1* | 8/2017 | Tran | G06F 1/163 | 434/247 |
| 2018/0205230 A1* | 7/2018 | Kudo | H02J 3/322 | |
| 2018/0238698 A1* | 8/2018 | Pedersen | G01C 21/3492 | |
| 2018/0241229 A1* | 8/2018 | Kitaoka | B60L 53/63 | |
| 2019/0299972 A1* | 10/2019 | Honjo | B60W 40/13 | |
| 2020/0171972 A1* | 6/2020 | Cha | B60K 35/28 | |
| 2020/0234575 A1* | 7/2020 | Hishida | G08G 1/0145 | |
| 2021/0090139 A1* | 3/2021 | Khoo | B60L 53/63 | |
| 2021/0272394 A1* | 9/2021 | Cella | G06Q 40/08 | |
| 2021/0334719 A1* | 10/2021 | Hishida | G06Q 10/1093 | |
| 2021/0334915 A1* | 10/2021 | Hishida | H02J 3/322 | |
| 2022/0383664 A1* | 12/2022 | Zeng | G07C 5/085 | |
| 2023/0101183 A1* | 3/2023 | Cella | G01C 21/343 | 701/31.4 |
| 2023/0246467 A1* | 8/2023 | Salter | B60L 58/14 | 320/109 |
| 2023/0246471 A1* | 8/2023 | Salter | B60L 53/67 | 320/109 |
| 2024/0034170 A1* | 2/2024 | Brannan | G06Q 30/08 | |
| 2024/0227616 A1* | 7/2024 | Bloom | B60L 58/27 | |
| 2024/0343149 A1* | 10/2024 | Galbraith | G06Q 50/06 | |
| 2024/0354664 A1* | 10/2024 | Pröbstl | G06Q 50/40 | |

* cited by examiner

200

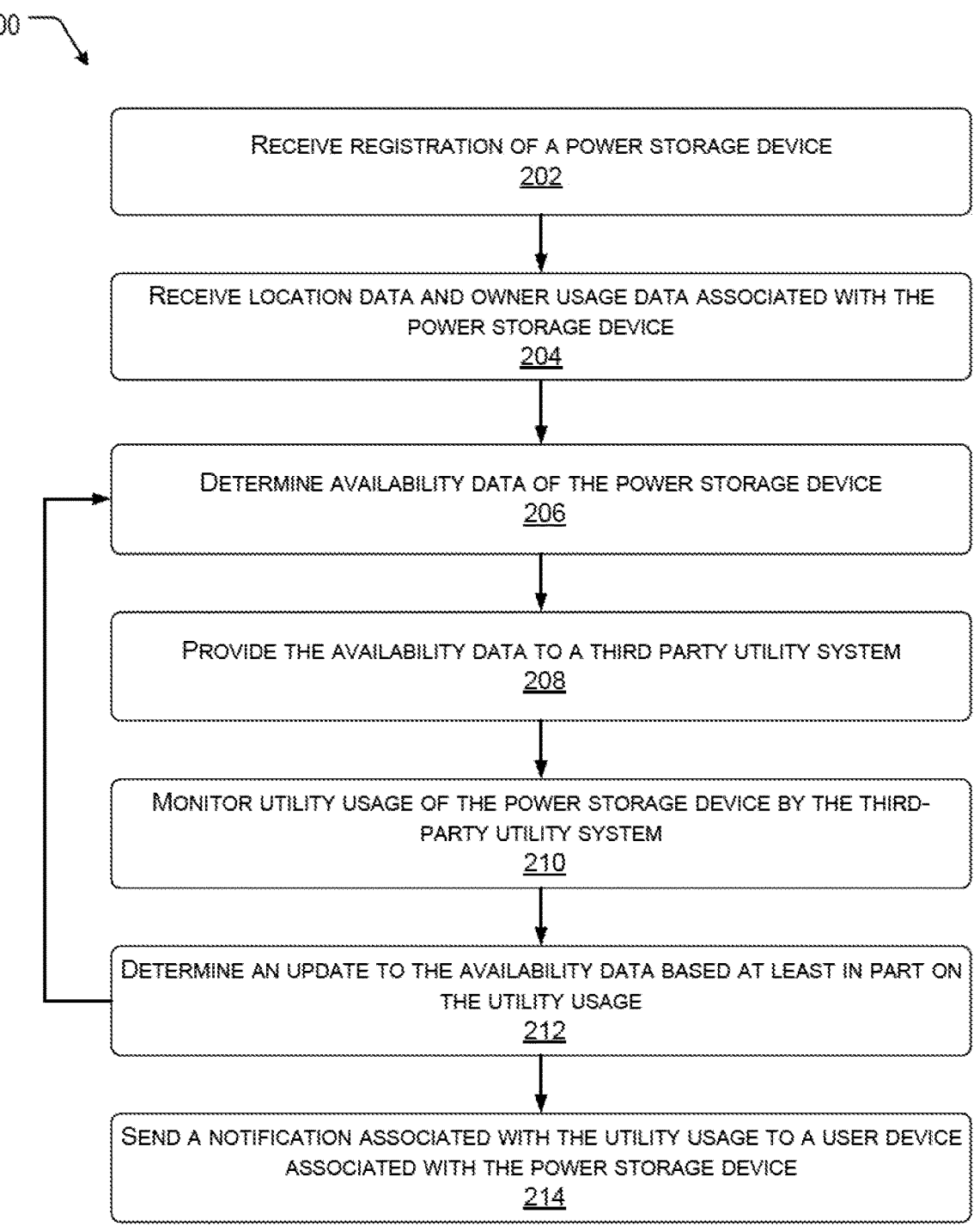

RECEIVE REGISTRATION OF A POWER STORAGE DEVICE
202

RECEIVE LOCATION DATA AND OWNER USAGE DATA ASSOCIATED WITH THE POWER STORAGE DEVICE
204

DETERMINE AVAILABILITY DATA OF THE POWER STORAGE DEVICE
206

PROVIDE THE AVAILABILITY DATA TO A THIRD PARTY UTILITY SYSTEM
208

MONITOR UTILITY USAGE OF THE POWER STORAGE DEVICE BY THE THIRD-PARTY UTILITY SYSTEM
210

DETERMINE AN UPDATE TO THE AVAILABILITY DATA BASED AT LEAST IN PART ON THE UTILITY USAGE
212

SEND A NOTIFICATION ASSOCIATED WITH THE UTILITY USAGE TO A USER DEVICE ASSOCIATED WITH THE POWER STORAGE DEVICE
214

FIG. 2

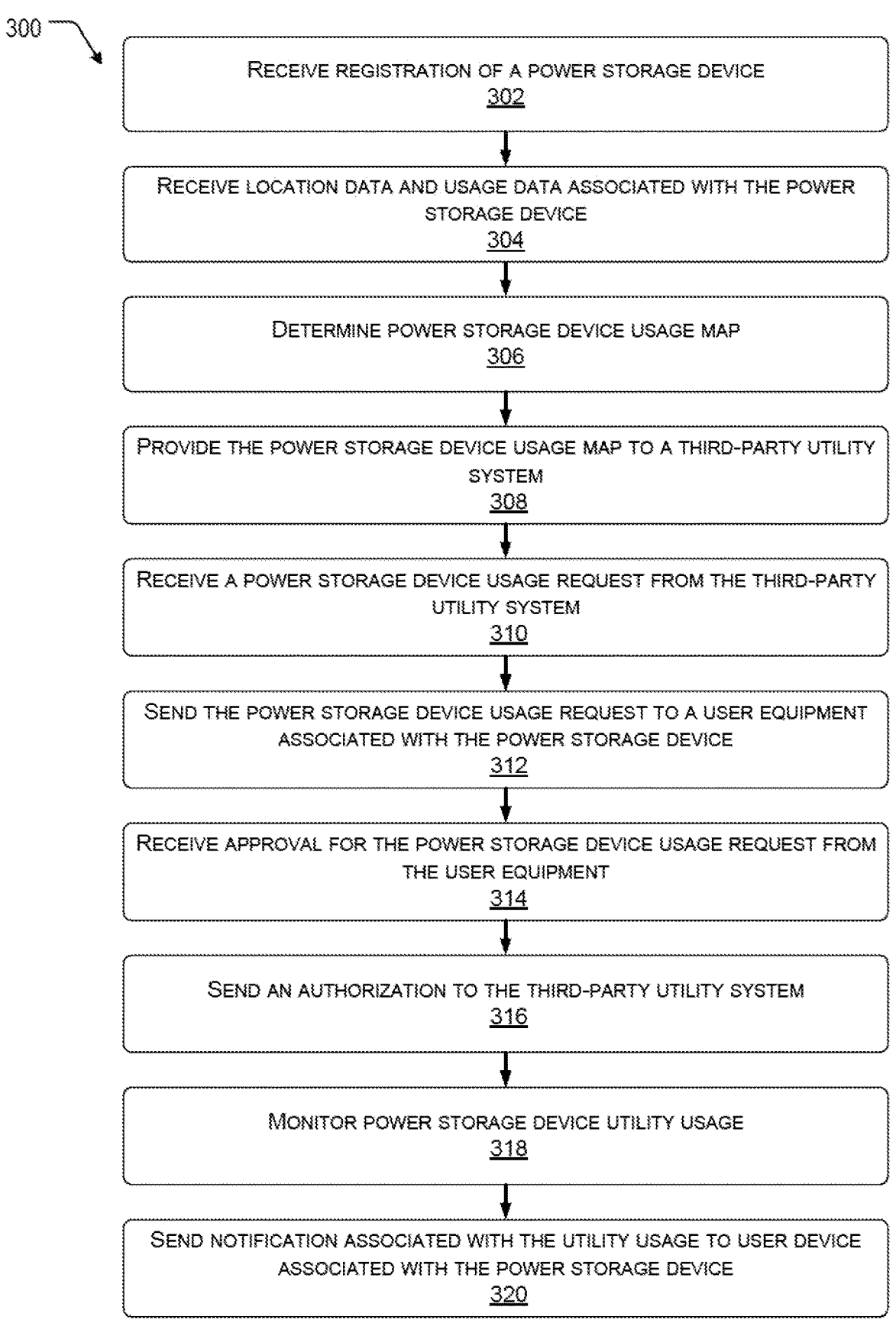

300

RECEIVE REGISTRATION OF A POWER STORAGE DEVICE
302

RECEIVE LOCATION DATA AND USAGE DATA ASSOCIATED WITH THE POWER STORAGE DEVICE
304

DETERMINE POWER STORAGE DEVICE USAGE MAP
306

PROVIDE THE POWER STORAGE DEVICE USAGE MAP TO A THIRD-PARTY UTILITY SYSTEM
308

RECEIVE A POWER STORAGE DEVICE USAGE REQUEST FROM THE THIRD-PARTY UTILITY SYSTEM
310

SEND THE POWER STORAGE DEVICE USAGE REQUEST TO A USER EQUIPMENT ASSOCIATED WITH THE POWER STORAGE DEVICE
312

RECEIVE APPROVAL FOR THE POWER STORAGE DEVICE USAGE REQUEST FROM THE USER EQUIPMENT
314

SEND AN AUTHORIZATION TO THE THIRD-PARTY UTILITY SYSTEM
316

MONITOR POWER STORAGE DEVICE UTILITY USAGE
318

SEND NOTIFICATION ASSOCIATED WITH THE UTILITY USAGE TO USER DEVICE ASSOCIATED WITH THE POWER STORAGE DEVICE
320

FIG. 3

SYSTEM FOR DETERMINING POWER SOURCE LOCATION AND AVAILABILITY

BACKGROUND

Production of energy through green or alternative energy sources, such as solar and wind, has been growing at an ever increasing pace. Unfortunately, many of the green energy sources experience high volatility with regards to energy production based on various environmental factors. Often during peak energy generation periods, such as daytime hours for solar and high wind events for wind turbines, access power is generated that is unable to be used or otherwise absorbed by the nearby utility system. In some cases, power storage may be used to store the access power, however, often the power storage devices are at a location distant from the power generation sources resulting in power loss over transmission cables. Additionally, the power storage devices available to the utility system may become full and the utility may again experience loss of access power over the storage capacity of the utility system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a flow diagram illustrating an example process associated with the determining availability data of a power storage device according to some implementations.

FIG. 3 is a flow diagram illustrating an example process associated with the determining availability data of a power storage device based on a location of the power storage device according to some implementations.

DETAILED DESCRIPTION

Figure 1:
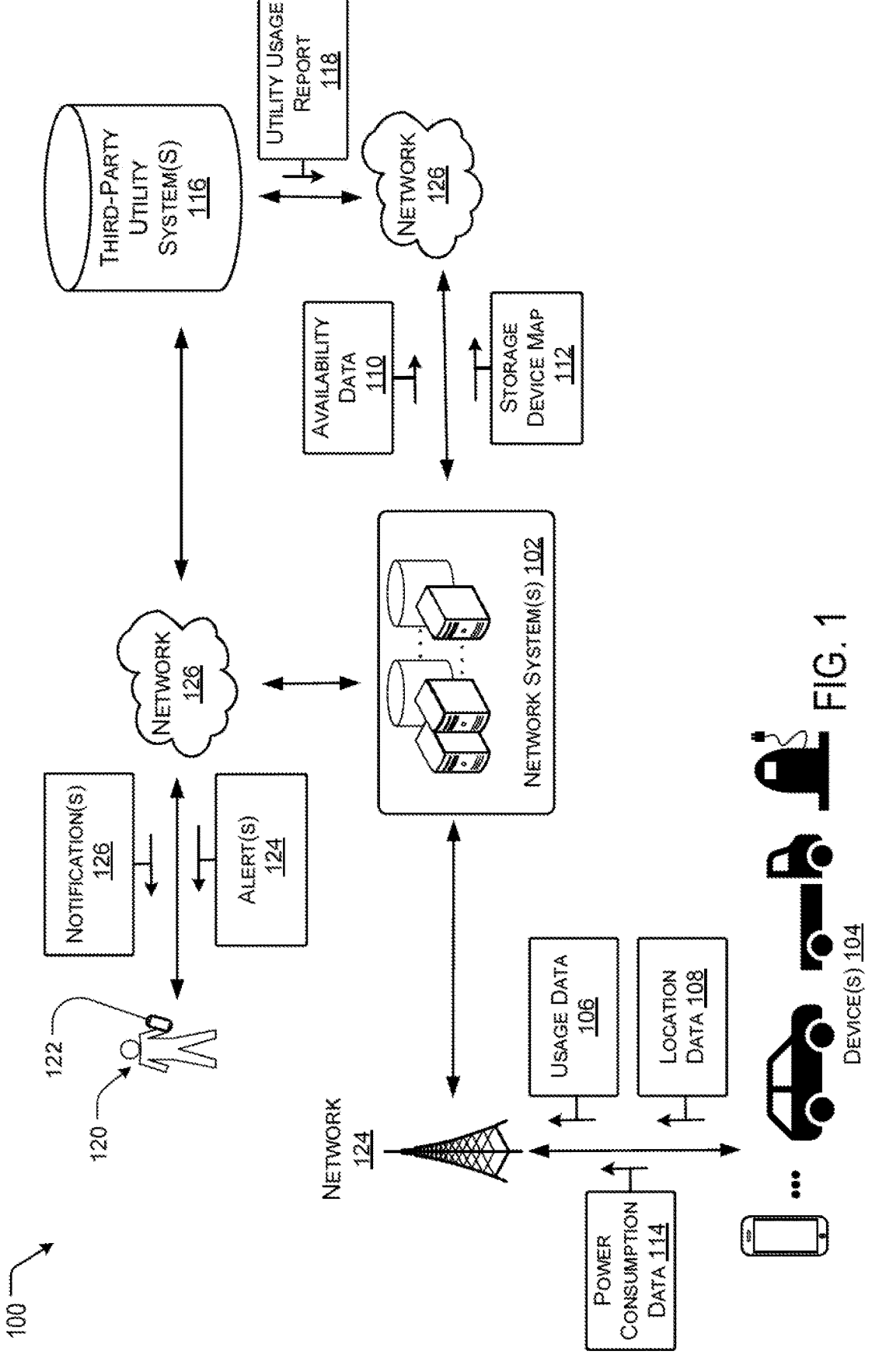
FIG. 1 is an example block diagram of an architecture for tracking availability and location of batteries associated with a communication network according to some implementations.

Discussed herein is a system for monitoring locations and availability of mobile power storage devices, such as electric vehicle batteries. In some cases, the system may allow owners of mobile power storage devices to register the mobile power storage devices for use by a nearby or proximate power grid of a utility system when the devices (e.g., electric vehicles) associated with the mobile power storage devices are not in use by the owner. Upon registration, the system, discussed herein, may capture or generate location data and/or usage data associated with the mobile power storage device. For example, the electric vehicle (or a device in wireless communication, such as Bluetooth®, with the electric vehicle) may be in further wireless communication with a network for providing cellular, mobile, or data services.

In some cases, the network systems may generate usage data and/or track the usage of the mobile power storage device based on a connectivity data associated with the device associated with the mobile power storage device with respect to the network. For example, when the device is actively in communication with the network, the device may be considered in use. In some specific examples, the network may apply one or more thresholds to determine usage data. For example, if the device is idle or has a connectivity or activity level below or equal to a first threshold for a period of time greater than or equal a second threshold, the network system may determine that for the corresponding period of time the mobile power storage device is not in use by the owner.

Over time (e.g., days, weeks, months, years, and the like) the network system may determine a usage calendar for the mobile power storage device. The network system may also determine usage trends (such as highly idle or highly used days of the week, weeks of the month, and the like). As an illustrative example, the network system may determine that an owner of an electric vehicle does not utilize the vehicle on Saturdays, between the hours of 9 PM and 4 AM, or the like. In some cases, the system may apply a bounding time frame with respect to the trends, such as if the owner typically does not use the electric vehicle between the hours of 9 PM and 4 AM, the network system may mark the mobile power storage device associated with the vehicle as available from 11 PM to 1 AM by applying a two hour bounding time frame to the hours of availability.

In some cases, the network systems may also track a location of the mobile power storage device based on a detected physical position of the mobile power storage device with respect to the network. For example, the network system may determine a location of a mobile power storage device associated with an electric vehicle as the vehicle is being used based on the network connectivity of the vehicle or a user device in communication with the vehicle. When the connectivity is interrupted (e.g., the vehicle is turned off), the network system may record the location as stable or fixed until the connectivity of the network is reestablished.

Similar to the usage calendar discussed above, the network system may also determine location data associated with the registered mobile power storage devices. For example, the network system may determine a mobile power storage device map or topology including a generalized location for each mobile power storage device registered with the network.

In some cases, the network system may also determine location trends and/or the mobile power storage device map may be a calendar or otherwise time based, such that the location or an expected location of individual mobile power storage devices may be determined over time or at predicted times in the future. For example, if a mobile power storage device, such as a battery of an electric vehicle, is typically located at an office building during the hours of 8 AM to 5 PM Monday through Friday, the network system may predict based on the location trends and/or the location calendar map that the battery of the electric vehicle will be located proximate to the location of the office building during the hours of 8 AM to 5 PM Monday through Friday and based on the usage calendar that the vehicle is not in use during that same period of time or a subset of that period of time.

It should be understood, that with regard to the collection and/or generation of usage data and location data, the network system may determine an identifier associated with mobile power storage device, charge levels associated with mobile power storage device, storage capacity associated with mobile power storage device, power consumption of the associated with mobile power storage device during use by the owner, and the like.

With regards to the power consumption data, the data may be generated or tracked overtime similar to the usage data and the location data, such that the network system and/or third-party utility system may avoid over draining the mobile power storage device. In this manner, the network system and/or the third-party utility system may ensure or safeguard (based on consumption trends by the individual owner) at least a portion of the capacity of the mobile power storage device for use by the owner. Accordingly, the higher the power consumption by the owner, the higher the safeguard capacity or stored charge levels may be with regard to the specific mobile power storage device.

In various examples, the network system may provide to the third-party utility system or utilize the usage data and the location data together with power generation data received from the third-party utility system to identify access power generation, a region associated with the access power generation, as well as an identity, available capacity (e.g., determined based on maximum capacity and consumption data), and the like. In this manner, during peak generation periods, the third-party utility system may then direct power to a mobile power storage device based on proximity to the region, available capacity, and known availability. Likewise, during low power generation periods, the third-party utility system may access or consume the available or stored capacity or power on the mobile power storage device.

In the various examples, the third-party utility system may credit or otherwise compensate, the owner for use of the mobile power storage device. For example, the third-party utility system may credit or otherwise compensate the owner based on a storage capacity used and duration, stored power consumed, or the like.

In one specific example, the system may utilize network slicing to provide a virtual network overall that may be shared with the third-party utility systems. For example, the virtual network overall may include usage data, availability data, location, and the like associated with various registered mobile power storage devices that may be viewed or otherwise accessed by the third-party utility system in substantially real-time. In some cases, the system may provide for multiple slices, such that each slice may have its own logical topology, security rules and performance characteristics within the limits imposed by the underlying physical networks. Accordingly, different slices may be dedicated to different data types or proposes (e.g., availability, location, capacity, current charge or power storage, and the like). In some cases, the slices may be used to ensure or prioritize access and/or service, such as to preferred third-party utility systems or the like.

FIG. 1 is an example block diagram of an architecture 100 for tracking availability and location of batteries associated with a communication network systems 102 according to some implementations. In the current example, various devices 104 may be registered with or otherwise in communication with the network systems 102. For example, user device 104 may be in direct communication with the network systems 102 for transmitting data. Similarly, a device, such as an electric vehicle, may be in communication with the network system 102 via a second device, such as the user device 104 (e.g., the vehicle may be in Bluetooth communication with the user device 104, which is in wireless or cellular communication with the network systems 102).

In the current example, the network systems 102 may capture or generate usage data 106, activity data, and/or track the usage of a mobile power storage of the device 104 based on connectivity data associated with the device 104. For example, when the device 104 is actively in communication with the network systems 102, the device 104 may be considered in use and/or transmitting usage data 106 to the network systems 102. In some specific examples, the network systems 102 may apply one or more thresholds with respect to determining usage data 106. For example, if the device 104 is idle or has a connectivity or activity level below or equal to a first threshold for a period of time greater than or equal a second threshold, the network systems 102 may determine that for the corresponding period of time the device 104 is not in use by the owner.

Over time (e.g., days, weeks, months, years, and the like) the network systems 102 may determine availability data 110 (such as a usage calendar) for the individual devices 104 and any associated mobile power storage capabilities. The availability data 110 may also include usage trends (such as highly idle or highly used days of the week, weeks of the month, and the like). In some cases, the network systems 102 may apply a bounding time frame with respect to the availability data 110, such as if the owner typically does not use a device 104 between the hours of 9 PM and 4 AM, the network systems 102 may generate availability data 110 for the mobile power storage device associated with the device 104 as available from 11 PM to 1 AM by applying a two hour bounding time frame to the hours of availability.

In some cases, the network systems 102 may also track location data 108 of the device 104 (and, thereby, the mobile power storage associated therewith) based on a detected physical position of the device 104 with respect to the network systems 102. For example, the network systems 102 may determine location data 108 of the device 104 based on the network connectivity of the device 104. When the connectivity is interrupted (e.g., the device 104 is turned off), the network systems 102 may record the location as stable or fixed until the connectivity to the network systems 102 are reestablished. In other cases, the location data may include global position satellite (GPS) data or the like generated by the device 104 and provided to the network systems 102 via wireless communication protocols of the network.

In this example, the network systems 102 may also generate a storage device map 112 based at least in part on the collected or generated location data 108 associated with each device 104. For example, the network systems 102 may determine a storage device map 112 (and/or data related thereto) including a generalized location for each device 104 registered with the network systems 102. In some cases, the storage device map 112 may also include location trends (such as time based trends, expected locations, predicted locations and/or times, and the like).

It should be understood, that with regard to the collection and/or generation of usage data 106 and location data 108, the network systems 102 may determine an identifier associated with device 104 and/or power consumption data 114. For example, the power consumption data 114 may include current charge levels associated with device 104 (or time stamped charge levels), storage capacity associated with device 104, a storage type associated with the device 104, power consumption, predicted power consumption, or power consumption trends associated with device 104 by the owner, and the like.

With regards to power consumption data 114, the data 114 may be generated or tracked overtime similar to the usage data 106 and the location data 108, such that the network systems 102 and/or third-party utility systems 116 partnering with the network systems 102 may avoid over draining the power storage of the devices 104. In this manner, the network systems 102 and/or the third-party utility systems 116 may ensure or safeguard (based on consumption trends by the individual owner) at least a portion of the capacity of the power storage of the individual devices 104 for use by the owners. Accordingly, the higher the power consumption indicated by the power consumption data 114 by the owner, the high the safeguard capacity or stored charge levels may be with regard to the specific device 104.

In various examples, the network systems 102 may provide to the third-party utility systems 116 the usage data 106, the location data 108, and/or the power consumption data 114. In some cases, the network systems 102 may also provide the availability data 110 and/or the storage device map 112 of the third-party utility systems 116. In this manner, during peak generation periods, the third-party utility systems 116 may direct power to a power storage devices of the devices 104 based on proximity, available capacity, usage, and known availability. Likewise, during low power generation periods, the third-party utility systems 116 may access or consume the available or stored capacity or power stored on the devices 104, again based on proximity, available capacity, usage, and known availability.

In the current example, the third-party utility systems 116 may generate a utility usage report 118 including details, metrics, or other data associated with power consumed and/or stored on one or more of the devices 104. In some cases, the utility usage report 118 may be utilized to provide credits, debits, or otherwise balance an account of the individual user 120 registered with the network systems 102 and/or the third-party utility system 116 and associated with the device 104 whose storage was accessed.

The utility usage report 118 may also be utilized by the network systems 102 and/or the third-party utility system 116 to generate alerts 124 and/or notifications 126 for the user 120. For example, the alerts 124 and/or notifications 126 may be delivered to user equipment (UE) 122 associated with the user 120. As an illustrated example, the UE 122 may host an application that is associated with the third-party utility system 116 and/or the network systems 102 for registering, tracking storage capacity usage, de-registering devices 104 to the power storage service, discussed herein. For instance, an alert 124 may be provided to the UE 122 when utilization the storage capacity of the device 104 commences, exceeds or meets one or more thresholds, or ceases. In some cases, the alert 124 may indicate if power is being stored on the device 104 or consumed by the third-party utility system 116.

The notifications 126 may include a summary, data, or other analytics associated with the third-party utility system 116 usage of the storage capacity of the devices 104. For example, the notifications 126 may include period of times when the storage capacity was accessed, the type of access, amount of power consumed/stored, any credit/debit to the account of the user 120, or the like. In some cases, the notifications 126 may be received on a periodic basis, such as daily, weekly, monthly, or the like.

In some examples, one or more machine learned models may be utilized by the network systems 102 and/or the third-party utility system 116 to select devices 104 for power consumption and/or storage, generate availability data 110 and/or data of the storage device map 112 based at least in part on the usage data 106, location data 108, and/or the power consumption data 114.

As some examples, machine learning algorithms can include, but are not limited to, neural networks, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In the current examples, the usage data, 106, location data 108, the power consumption data 114, the availability data 110, the storage device map 112, the utility usage reports 118, the alerts 124, and the notifications 126 may be sent and/or received via one or more networks 126 including networks of the network systems 102.

FIGS. 2 and 3 are flow diagrams illustrating example processes associated with network systems and third-party utility systems discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example process 200 associated with the determining availability data of a power storage device according to some implementations. As discussed above, the network system may be configured to capture and generate availability data associated with the accessibility of power storage capacities of mobile devices registered with the system. The availability data may include locations, periods of time, storage capacity, usage data, power consumption data, and the like of a particular mobile device.

For example, the availability data may include data indicating that a power storage device may have a stored available charge of 10 kWh (e.g., amount of power that may be consumed by the third-party utility system without impacting the owner of the power storage device) and an available capacity of 5 kWh (e.g., an amount of additional power that may be stored on the power storage device) during a specific period of time. The availability data may also include a location or region of the power storage device during the specific period of time. In this example, the third-party utility system may utilize the power storage device during the specific period of time based at least in part on the availability data.

At 202, the system may receive a registration of a power storage device allowing one or more third-party utility systems to access the capabilities of the power storage device when the device is not in use by the owner. However, upon registration the system may be unaware of the habits and usage of the power storage device of the owner and, therefore, may monitor or track the power storage device via an associated network, such as a wireless and/or cellular network.

At 204, the system may receive location data and usage data associated with the power storage device. For example, the usage data may include data associated with the active use or interaction with mobile power storage device by the owner or user. In some cases, the usage data may include interaction data associated with the device and the network. In some specific examples, the system may apply one or more thresholds with respect to determine usage data. For example, if the device is idle or has a connectivity or activity level below or equal to a first threshold for a period of time greater than or equal a second threshold, the system may determine that for the corresponding period of time the mobile power storage device is not in use by the owner or user. The location data may include satellite, such as GPS, positions, region or connected/proximate tower/modem of a cellular network, rate of movement, direction of travel, and the like.

At 206, the system may determine availability data and/or trends of the power storage device. For example, the availability data may be determined based at least in part on the usage data and/or the location data. In some cases, the system may apply one or more thresholds or buffers (such as a period of time) when generating the availability data.

As an illustrative example, if the usage data indicates that the device is not in use from the hours of 8 pm to 6 am, the system may apply a period of time, such as 1 hour, to the availability (e.g., to reduce the availability to 9 pm to 5 am) to ensure that the third-party utility system is not actively utilizing the power storage device when the user or owner desires the device. It should be understood that the amount of time may vary depending on the device, total concurrent available time or period, location, capacity level or current capacity, consistency of the user in accessing the device, and the like. It should also be understood that the period of time may vary, such as in the above example, the period of time may be reduced to 9 pm and 5:30 am as the user may be more consistent with access trends in the morning than at night.

At 208, the system may provide the availability data to a third-party utility system and, at 210, the system may monitor utility usage of the power storage device by the third-party utility system. For example, the system may receive periodic updates as to the charge level or capacity level of the power storage device via the network. In this manner, the system may monitor the amount of consumption or storage during the available period by the third-party utility system. In some cases, the system may also receive utility usage reports from the third-party utility system. In this example, the system may reconcile the utility usage reports with the data generated by monitoring the charge level or capacity level of the power storage device via the network to ensure proper credit or debits to the account of the user.

At 212, the system may determine an update to the availability data based at least in part on the utility usage. For example, the system may determine the utility usage is consuming excessive power, such that the owner or user does not have sufficient remaining charge levels for their day to day activities. In this example, the system may provide the update back to 206, such that the system may update the availability data of the power storage device accordingly.

At 214, the system may send a notification associated with the utility usage to a UE associated with the power storage device or the user. For example, the notification may include a summary, data, or other analytics associated with the third-party utility system usage of the power storage device. For example, the notifications may include period of times when the storage capacity was accessed, the type of access, amount of power consumed/stored, any credit/debit to the account of the user, or the like. In some cases, the notifications may be received on a periodic basis, such as daily, weekly, monthly, or the like.

FIG. 3 is a flow diagram illustrating an example process 300 associated with the determining availability data of a power storage device based on a location of the power storage device according to some implementations. As discussed above, the network system may be configured to capture and generate availability data as well as location data or storage device maps associated with the accessibility of power storage capacities of mobile devices registered with the system. The availability data and maps may include locations, periods of time, storage capacity, usage data, power consumption data, and the like of a particular mobile device. The availability data and maps may also include a location or region of the power storage device during the specific period of time. In this example, the third-party utility system may utilize the power storage device during the specific period of time based at least in part on the availability data and the storage device maps.

At 302, the system may receive a registration of a power storage device allowing one or more third-party utility systems to access the capabilities of the power storage device when the device is not in use by the owner. However, upon registration the system may be unaware of the habits and usage of the power storage device of the owner and, therefore, may monitor or track the power storage device via an associated network, such as a wireless and/or cellular network.

At 304, the system may receive location data and usage data associated with the power storage device. For example, the usage data may include data associated with the active use or interaction with mobile power storage device by the owner or user. In some cases, the usage data may include interaction data associated with the device and the network. In some specific examples, the system may apply one or more thresholds to determine usage data. For example, if the device is idle or has a connectivity or activity level below or equal to a first threshold for a period of time greater than or equal a second threshold, the system may determine that for the corresponding period of time the mobile power storage device is not in use by the owner or user. The location data may include satellite, such as GPS, positions, region or connected/proximate tower/modem of a cellular network, rate of movement, direction of travel, and the like.

At 306, the system may determine a power storage device usage map based at least in part on the location data and/or the usage data. In some cases, the power storage device usage map may vary over time of day, season, month, weekday v. weekend, week by week, and the like. The system may also aggregate data from multiple power storage devices. The system may also apply regions to the map such that each power storage device available at the given period of time may be assigned a region for ease of processing by the third-party utility system. In some examples, the map may include aggregated available capacity per region, aggregated available supply per region, and the like.

At 308, the system may provide a power storage device usage map to a third-party utility system. The third-party utility system may utilize the power storage device usage map to select individual power storage devices for use during an upcoming period of time.

At 310, the system may receive a power storage device usage request from the third-party utility system and, at 312, the system may send the power storage device usage request to a UE associated with the power storage device for an approval by the owner or user. For example, in some instances, the user may request that the system or the user pre-approve any access by the third-party utility system to their power storage device. In this manner, the user and/or the system may have additional control over the access and usage of the third-party utility system to their devices.

At 314, the system may receive approval for the power storage device usage request form the UE and, at 316, the system may send an authorization to the third-party utility system. Once the authorization is received by the third-party utility system, the third-party utility system may begin to consume or store power with regards to the power storage device.

At 318, the system may monitor utility usage of the power storage device by the third-party utility system. For example, the system may receive periodic updates as to the charge level or capacity level of the power storage device via the network. In this manner, the system may monitor the amount of consumption or storage during the available period by the third-party utility system. In some cases, the system may also receive utility usage reports from the third-party utility system. In this example, the system may reconcile the utility usage reports with the data generated by monitoring the charge level or capacity level of the power storage device via the network to ensure proper credit or debits to the account of the user.

At 320, the system may send a notification associated with the utility usage to a UE associated with the power storage device or the user. For example, the notification may include a summary, data, or other analytics associated with the third-party utility system usage of the power storage device. For example, the notifications may include period of times when the storage capacity was accessed, the type of access, amount of power consumed/stored, any credit/debit to the account of the user, or the like. In some cases, the notifications may be received on a periodic basis, such as daily, weekly, monthly, or the like.

Figure 4:
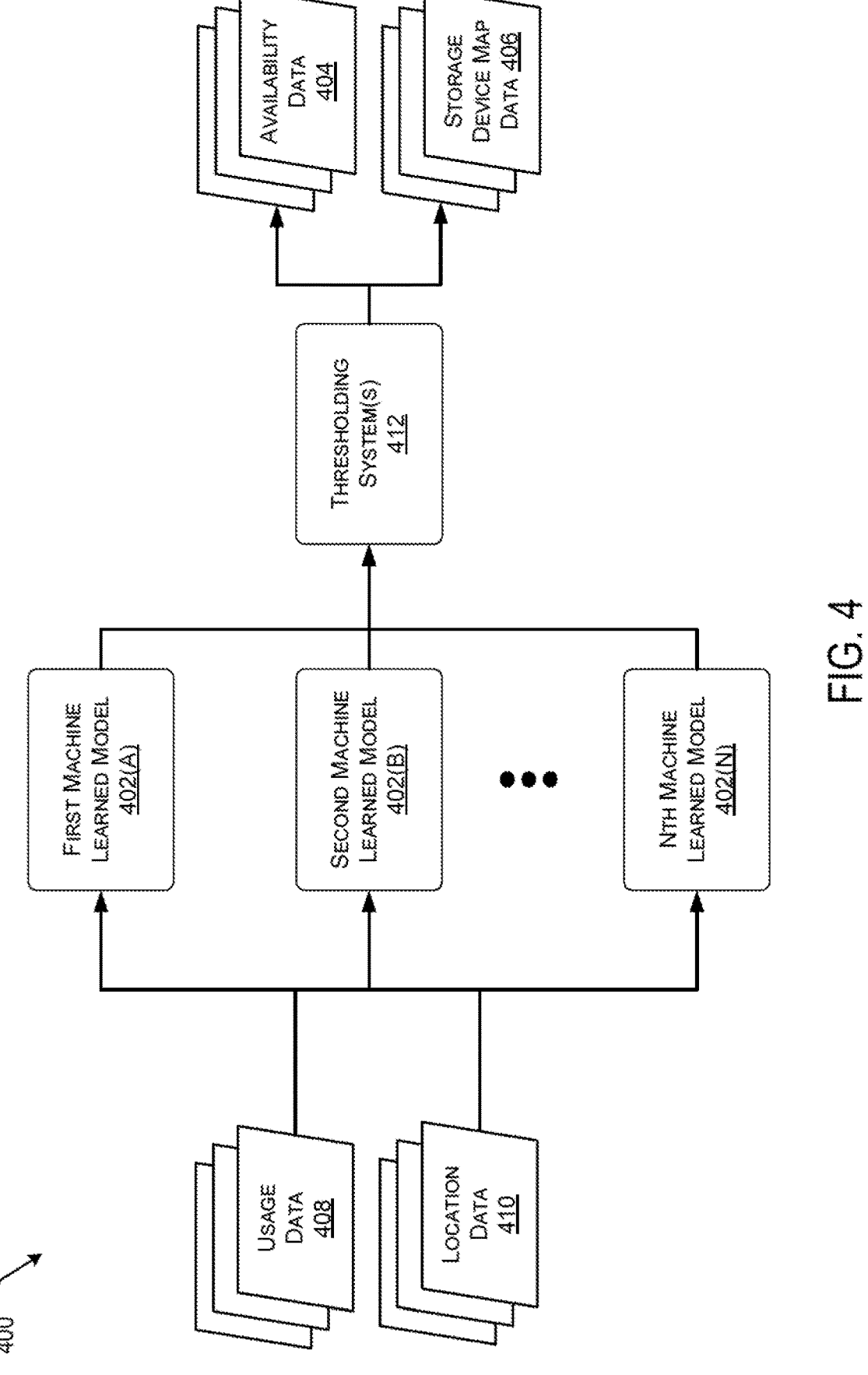
FIG. 4 is an example architecture of a network system for tracking mobile power storage devices according to some implementations.

FIG. 4 is an example architecture 400 of a network system for tracking mobile power storage devices according to some implementations. In this example, one or more machine learned models 402(A)-(N) or other process may be used to generate the availability data 404 and/or the storage device map data 406 provided to the third-party utility system.

For instance, the network system may receive usage data 408 and/or location data 410 from one or more mobile power storage devices via the associated network. In some cases, the usage data 408 may include current charge data, storage capacity data, activity data, and the like associated with the mobile power storage devices. The location data 410 may include a region (such as a one by one meter square or the like), a satellite position, an indication of one or more proximate cellular towers or modems, and the like. In some examples, the usage data 408 and/or the location data 410 may be captured or received at various intervals or periods (e.g., every second, every thirty seconds, every minute, every hour, and the like).

In the current example, the one or more machine learned models 402 or other process may receive the usage data 408 and/or the location data 410 to generate an output data, such as an initial availability data and/or an initial storage device map data. The initial availability data and/or the initial storage device map data may then be provided to a thresholding system 412. The thresholding system 412 may apply buffers or boundaries to the availability data 404 and/or the storage device map data 406 that may be utilized by a third-party utility system to select and access the power storage devices. For example, the thresholding system 412 may reduce one or more periods of time that individual power storage devices are available for use by the third-party utility system, reduce the total consumable charge of individual power storage devices available to the third-party utility system, reduce the portion of available capacity of individual power storage devices available to the third-party utility system, and/or the like.

Figure 5:
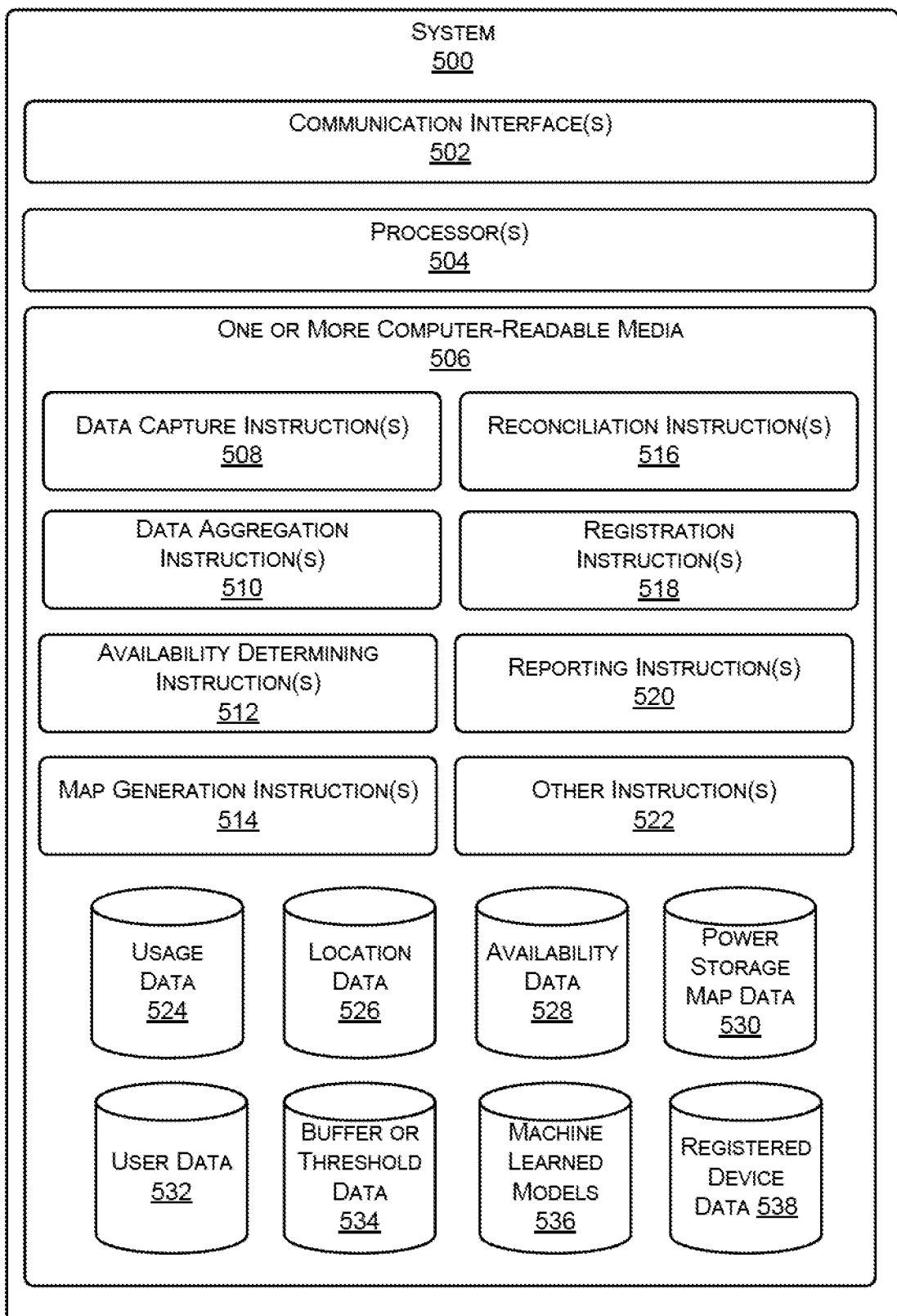
FIG. 5 is an example system that may implement the techniques described herein according to some implementations.

FIG. 5 is an example system 500 that may implement the techniques described herein according to some implementations. As discussed above, a network system 500 may be configured to register mobile power storage devices to monitor and determine available charge (power) and/or capacity available to a third-party utility system. For example, the system 500 may monitor usage data and/or location data to generate availability data and map data usable by the third-party utility system in accessing and utilizing the mobile power storage devices.

The system 500 may include one or more communication interface(s) 502 (also referred to as communication devices and/or modems). The one or more communication interfaces(s) 502 may enable communication between the system 500 and one or more other local or remote computing device(s), such as registered mobile power storage devices. For instance, the communication interface(s) 502 may facilitate communication with other proximity sensor systems, a central control system, or other facility systems. The communications interfaces(s) 502 may enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.), satellite communication, dedicated short-range communications (DSRC), or any suitable wired or wireless communications protocol that enables the respective computing device to interface with the other computing device(s).

The system 500 may include one or more processor(s) 504 and one or more computer-readable media 506. Each of the processors 504 may itself comprise one or more processors or processing cores. The computer-readable media 506 is illustrated as including memory/storage. The computer-readable media 506 may include volatile media (such as random access memory (RAM)) and/or nonvolatile media (such as read only memory (ROM), Flash memory, optical disks, magnetic disks, and so forth). The computer-readable media 506 may include fixed media (e.g., GPU, NPU, RAM, ROM, a fixed hard drive, and so on) as well as removable media (e.g., Flash memory, a removable hard drive, an optical disc, and so forth). The computer-readable media 506 may be configured in a variety of other ways as further described below.

Several modules such as instructions, data stores, and so forth may be stored within the computer-readable media 506 and configured to execute on the processors 504. For example, as illustrated, the computer-readable media 506 stores data capture instructions 508, data aggregation instructions 510, availability determining instructions 512, map generation instructions 514, reconciliation instructions 516, registration instructions 518, reporting instructions 520, as well as other instructions 522, such as an operating system. The computer-readable media 506 may also be configured to store data, such as usage data 524, location data 526, availability data 528, power storage map data 530, user data 532, buffer or threshold data 534, machine learned models 536, registered device data 538 as well as other data.

The data capture instructions 508 may be configured to receive and process the incoming mobile device data. For example, the data capture instructions 508 may include specified types of data to capture for further use in generating the availability data 528 and the power storage map data 530. Accordingly, the data capture instructions 508 may select data received from devices associated with the network system 500 to include in the usage data 524 and/or the location data 526.

In some examples, the data capture instructions 508 may be configured to query the mobile power storage devices for the usage data 524 and/or the location data 526 on a predetermined interval or periodic basis. In some cases, the query may be for specific data, a generalized report of the status of the system, or a query merely returning a response that the device is in an active state.

The data aggregation instructions 510 may be configured to aggregate the data associated with multiple mobile power storage devices into one or more overlay, map, topology, report, or the like. In some cases, multiple overlays, maps, topologies, reports, or the like may be generated to allow different levels of access for different third-party systems.

The availability determining instructions 512 may be configured to determine periods of time when individual registered devices are not in use by the owner and, thereby, available to the third-party utility systems. The availability determining instructions 512 may then utilize the period of time to generate availability data 528 based at least in part on the usage data 524. In some cases, the availability data 528 may include data associated with capacity, stored charge, as well as times when the power storage device is available for use by the third-party utility system.

The map generation instructions 514 may be configured to generate power storage map data 530 associated with the registered power storage devices. For example, the map generation instructions 514 may utilize the location data 526 for multiple registered devices to generate a map or overlay that includes the position of the devices. In some cases, the map generation instructions 514 may assign regions to individual devices, such as based on one or more last connected or currently connected cellular towers or modems. In some cases, the regions may be defined based at least in part on the proximity of components of the third-party utility system. In other examples, the map generation instructions 514 may categorize or regionalize the power storage devices based at least in part a distance from components of the third-party utility system. In this example, the map generation instructions 514 may rank or prioritize the power storage devices for individual utility systems based at least in part on the distance, category, and/or region.

The reconciliation instructions 516 may be configured to receive utility usage data from the third-party utility system and to verify that the third party utility system is accurately crediting and/or debiting accounts associated with the power storage devices based on the monitored data (e.g., the charge data received from individual devices). In this manner, the system 500 may be configured to assist in protecting the users of the network.

The registration instructions 518 may be configured to allow a user to register and/or de-register one or more devices from the power storage sharing features, discussed herein. In some cases, the registration instructions 518 may be configured to add a device or device identifier to the availability data 528 and/or the power storage map data 530 when the device is registered and to remove the device or device identifier to the availability data 528 and/or the power storage map data 530 when the device is de-registered. In some cases, the registration instructions 518 may also allow the owner or user to pause access by third-party utility systems for specific periods of time (such as when the user is going on vacation or the like).

The reporting instructions 520 may be configured to generate alerts, reports, and/or notifications for the owners of the power storage devices. For example, the reporting instructions 520 may provide a daily, weekly, and/or monthly summary of the usage by the third-party utility system for each registered device to the user. The reporting instructions 520 may also generate an alert each time a third-party utility system accesses the power storage capacity of a registered device. In some cases, the alerts may allow a user to disengage the access by the third-party utility system, for instance, if the user has a change in schedule that deviates from a determined trend.

In some examples, the system 500 may utilize network slicing to provide a virtual network overall that may be shared with or accessed by the third-party utility systems. For example, the virtual network overall may include usage data 524, the location data 526, availability data 528, the power storage map data 530, and the like associated with various registered mobile power storage devices that may be viewed or otherwise accessed by the third-party utility system in substantially real-time. In some cases, the system may provide for multiple slices, such that each slice may have its own logical topology, security rules and performance characteristics within the limits imposed by the underlying physical networks. Accordingly, different slices may be dedicated to different data types or proposes (e.g., availability, location, capacity, current charge or power storage, and the like). In some cases, the slices may be used to ensure or prioritize access and/or service, such as to preferred third-party utility systems or the like.

In some cases, the system 500 may also adjust the availability data 528 and/or the power storage map data 530 based on a current season, weather, time of day, day of the week, and/or demographic data associated with the user. For example, the system 500 may determine usage trends for the mobile power storage device that vary based on current season, weather, time of day, day of the week, and/or demographic data associated with the user. For instance, users within a working age of 18 to 65 may be more consistent with the usage trends during weekdays as the users are often engaged in the same activity during these times. In this manner, the system 500 may provide a smaller buffer or threshold when determining the availability data. As another example, during the winter the system 500 may determine the usage of the mobile device decreases as the user's may be more likely to work from home. In some cases, the usage trends may be determined using one or more machine learned models trained using usage data, weather data, time data, device class data, location data, and the like collected from a plurality of users and/or devices over various physical locals.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples.

What is claimed is:

1. A method comprising:

receiving, by one or more computing devices and via a communication network connected to a plurality of mobile devices, connectivity data associated with a mobile device, the connectivity data indicating an extent of connection to the communication network by the mobile device;

determining, by the one or more computing devices and based at least in part on the connectivity data, usage data associated with the mobile device, the usage data associated with access of the mobile device by a user of the mobile device;

determining, by the one or more computing devices, availability data for the mobile device based at least in part on the usage data, the availability data including a period of time during which the mobile device is not in use; and transmitting, by the one or more computing devices and to a third-party utility system, the availability data, wherein the availability data is utilized to at least one of:

cause power to be directed to the mobile device based at least in part on at least one of a proximity of the mobile device to a region, availability capacity, or known availability; or access or consume available stored capacity or stored power on the mobile device.

2. The method of claim 1, further comprising receiving a registration request for the mobile device prior to generating the availability data of the mobile device.

3. The method of claim 1, further comprising:

receiving location data associated with the mobile device, the location data associated with access of the mobile device by the user of the mobile device;

determining storage device map data based at least in part on the location data, the storage device map data including a location of the mobile device during the period of time; and providing the storage device map data to the third-party utility system with the availability data, wherein the availability data and the storage device map data are provided to the third-party utility system as one or more overlays to a network.

4. The method of claim 1, further comprising:

modifying the period of time based at least in part on a buffer or threshold prior to providing the availability data to the third-party utility system.

5. The method of claim 1, further comprising:

monitoring a charge level of the mobile device during the period of time;

receiving utility usage data associated with the mobile device from the third-party utility system;

verifying the utility usage data based at least in part on the charge level; and providing a notification to a user equipment associated with the mobile device, the notification indicating the utility usage data.

6. The method of claim 1, wherein determining the availability data for the mobile device further comprises:

determining a usage trend associated with the user of the mobile device based at least in part on the usage data; and determining the availability data based at least in part on the usage trend.

7. The method of claim 1, wherein determining the availability data for the mobile device further comprises:

inputting the usage data into one or more machine learned models trained on usage data of a plurality of devices having a class in common with the mobile device; and receiving the availability data as an output of the one or more machine learned models.

8. The method of claim 1, wherein the mobile device is an electric vehicle.

9. The method of claim 1, wherein determining the availability data comprises:

determining, by the one or more computing devices and via the communication network, that the mobile device has been idle or has an activity level below a first threshold activity level for a second threshold amount of time; and determining, based at least in part on determining that the mobile device has been idle or has the activity level below the first threshold activity level for the second threshold amount of time, that the mobile device has not been in use for the period of time.

10. The method of claim 1, further comprising, based at least in part on the availability data, at least one of:

reducing one or more periods of time that individual mobile devices are available to the third-party utility system;

reducing a total consumable charge of the individual mobile devices that are available to the third-party utility system; or reducing a portion of availability capacity of the individual mobile devices that are available to the third-party utility system.

11. A system comprising:

one or more processors; and one or more non-transitory computer-readable media storing instructions that, when executed by the one or more processors, cause the one or more processors to perform operations comprising:

receiving usage data associated with a mobile device, the usage data associated with access of the mobile device by a user of the mobile device;

determining availability data for the mobile device based at least in part on the usage data, the availability data including a period of time during which the mobile device is not in use;

receiving location data associated with the mobile device, the location data associated with access of the mobile device by the user of the mobile device; and determining storage device map data based at least in part on the location data, the storage device map data including a location of the mobile device during the period of time; and providing to a third-party utility system the availability data and the storage device map data, wherein the availability data is utilized to at least one of:

cause power to be directed to the mobile device based at least in part on at least one of a proximity of the mobile device to a region, availability capacity, or known availability; or access or consume available stored capacity or stored power on the mobile device.

12. The system of claim 11, wherein the availability data and the storage device map data are adjusted by the system based on a current season, weather, time of day, day of a week, or demographic data associated with the user.

13. The system of claim 11, wherein determining the availability data for the mobile device further comprises:

determining a usage trend associated with the user of the mobile device based at least in part on the usage data; and determining the availability data based at least in part on the usage trend.

14. The system of claim 11, wherein determining the storage device map data further comprises assigning a region to the mobile device during the period of time.

15. The system of claim 11, wherein determining the storage device map data further comprises assigning a third-party utility system to the mobile device based at least in part on a determined distance between the mobile device and components of the third-party utility system during the period of time.

16. The system of claim 11, further comprising modifying the period of time based at least in part on a buffer or threshold prior to providing the availability data to the third-party utility system.

17. A computer-implemented method comprising:

receiving location data associated with a mobile device, the location data associated with access of the mobile device by a user of the mobile device;

determining storage device map data based at least in part on the location data, the storage device map data including a location of the mobile device during a period of time; and providing to a third-party utility system the storage device map data, wherein the storage device map is utilized to at least one of:

cause power to be directed to the mobile device based at least in part on at least one of a proximity of the mobile device to a region, availability capacity, or known availability; or access or consume available stored capacity or stored power on the mobile device.

18. The computer-implemented method of claim 17, further comprising:

receiving usage data associated with the mobile device, the usage data associated with access of the mobile device by the user of the mobile device;

determining availability data for the mobile device based at least in part on the usage data, the availability data including a period of time during which the mobile device is not in use; and providing to a third-party utility system the availability data with the storage device map data, wherein determining the availability data for the mobile device comprises:

determining a usage trend associated with the user of the mobile device based at least in part on the usage data; and determining the availability data based at least in part on the usage trend.

19. The computer-implemented method of claim 17, further comprising:

monitoring a charge level of the mobile device during the period of time;

receiving utility usage data associated with the mobile device from the third-party utility system;

verifying the utility usage data based at least in part on the charge level; and providing a notification to a user equipment associated with the mobile device, the notification indicating the utility usage data.

20. The computer-implemented method of claim 17, further comprising receiving a registration request for the mobile device prior to generating the storage device map data of the mobile device.

* * * * *